United States Patent [19]

Kerschner et al.

[11] Patent Number: 5,018,059
[45] Date of Patent: May 21, 1991

[54] METHOD AND APPARATUS FOR TELECOMMUNICATIONS SIGNAL PROCESSING AND SWITCHING

[75] Inventors: Gunther Kerschner; Johann Wurzenberger, both of Munich; Herbert Hausmann, Olching; Giselher Eckel, Munich; Peter Friedrich, Seefeld, all of Fed. Rep. of Germany

[73] Assignee: Siemens Aktiengesellschaft, Berlin and Munich, Fed. Rep. of Germany

[21] Appl. No.: 729,441

[22] Filed: May 1, 1985

[30] Foreign Application Priority Data

May 4, 1984 [DE] Fed. Rep. of Germany ....... 3416542
May 4, 1984 [DE] Fed. Rep. of Germany ....... 3416582

[51] Int. Cl.$^5$ .............................................. H04M 3/00
[52] U.S. Cl. .................................... 364/200; 379/269;
364/228.3; 364/229; 364/229.3; 364/229.4;
364/238.5; 364/240.8; 364/240.9; 364/292.94;
364/284; 364/284.4
[58] Field of Search .............................. 379/284, 269;
364/200 MS File, 900 MS File; 340/225.05

[56] References Cited

U.S. PATENT DOCUMENTS

| | | | |
|---|---|---|---|
| 4,032,899 | 6/1977 | Jenny et al. | 364/200 |
| 4,347,582 | 8/1982 | Frank | 364/900 |
| 4,555,595 | 11/1985 | Brightman et al. | 379/284 |
| 4,614,841 | 9/1986 | Babecki et al. | 379/269 |
| 4,634,812 | 1/1987 | Hornburger et al. | 379/269 |
| 4,694,452 | 9/1987 | Beckinger et al. | 379/269 |
| 4,747,130 | 5/1988 | Ho | 364/200 |

Primary Examiner—Stuart N. Hecker
Assistant Examiner—Rebecca L. Rudolph
Attorney, Agent, or Firm—Adel A. Ahmed

[57] ABSTRACT

The establishment of connections between two subscriber or trunk locations or line terminating groups (TG1 ... TGm) in a communication switching system in which the individual subscriber or trunk locations or line terminating groups are interconnected on a ring-shaped bus arrangement (BUS 0, BUS 1) are carried out through the application of two computers (SB1 ... SBn) one of which interacts with or serves the calling subscriber location or line terminating group while the second computer interacts with or serves the subscriber location or line terminating group being called. The transmission of communications signals between subscriber locations or line terminating groups occurs through only one of the two computers.

6 Claims, 5 Drawing Sheets

METHOD AND APPARATUS FOR TELECOMMUNICATIONS SIGNAL PROCESSING AND SWITCHING

BACKGROUND OF THE INVENTION

1. Technical Field

The invention relates to the field of communications signal processing and switching methods and apparatus and in particular to a switching system in which respective subscriber locations or line terminating groups lie on a ring-shaped bus to which are connected at least two switching signal processors for establishing a call connection.

2. Description of the Prior Art

A switching system is already known, U.S. Pat. No. 4,032,899, in which a bus links a plurality of line terminating modules and a plurality of switching processor modules. Line used herein refers to both a line to a subscriber and to a trunk to another telephone switch. Each line terminating module (trunk terminating module) includes a group of transmission lines. The switching processor modules are directly linked to a line terminating module or to a group of transmission lines. Each switching processor module contains look-up tables in which the pre-determined allocations between each switching processor and its associated group of transmission lines are stored. In addition there is stored in each switching processing unit interconnect information on those switching processor modules which are allocated to all remaining transmission lines.

The system is operated to perform both circuit switching and store-and-forward switching of data packets. Circuit switching is accomplished by a central node control module by establishing a direct connection between line terminating modules, without the intervention of switching processor modules. For the transmission of data packets between two transmission lines, a virtual connection is established by the central node control module, and a pair of switching processor modules are assigned respectively to the sending transmission line and the receiving transmission line. After establishment of the virtual connection, the data packets are transmitted from the sending transmission line to the associated switching processor module and stored in a buffer therein. The first module then sends a clearance request to the switching processor module assigned to the receiving transmission line. When reception has been cleared, the first switching processor module retransmits the data packets to the line terminating module to which the receiving transmission line is connected. The second switching processor module is not involved in this transmission. This means, however, that a disturbance in the first switching processor module can very easily disrupt the establishment of the connection.

There are other ring-shaped bus systems known e.g. U.S. Pat. No. 2,986,602; "IBM Technical Disclosure Bulletin", Vol. 7, No. 7, Dec., 1964, pages 592, 593 in which communications between subscriber locations or between two groups of subscriber locations through a single central computer may be established. Mere again, however, the desired dependability during the establishment of communications is not available.

SUMMARY OF THE INVENTION

The object of the present invention is therefore to arrive at a way by which, though an improved method over the aforementioned art, a particularly dependable communications link may be established between various subscriber or trunk locations or line terminating groups.

The solution to the above described problems of the prior art derives from the fact that the communications link between two subscriber or trunk locations or between two line terminating groups is developed over two of the mentioned computers which along with the respective subscriber locations or line terminating groups are connected to a ring-shaped bus circuit. One computer serves that subscriber location or line terminating group that is calling while the other computer serves the subscriber location or line terminating group that is called. Furthermore, in each of the related computers, information is stored regarding the subscriber locations or line terminating groups between which a connection is to be established.

The invention results in the advantage that a dependable communications link and signal transmission between the subscriber locations or line terminating groups is made possible in a relatively simple way. For if one of the two computers employed in establishing the communications link fails, the respective link may be re-established by means of the still functioning computer. At this point, it should be noted that the so-called ring confirming signal is transmitted over the same path over which the link between the two subscriber locations or line terminating groups was established.

Suitably the transmission of communications signals between the line terminating groups or subscriber locations linked together is over that respective computer only through which the communications link was established. This results in the advantage that a disengagement of the computer in the ring-shaped bus circuit during the communications signal transmission phase may occur. Furthermore and in spite of this, a dependable signal transmission may be maintained.

Suitably the transmission of control signals related to the establishment of the communications link and the transmission of communications signals between already linked subscriber locations or line terminating groups and computers over the ring-shaped bus arrangement is attempted only after the respective ring-shaped bus circuit for the subscriber location or line terminating group or the related computer is released. This results in the advantage that operation is dependable not only during the establishment of the connection but during the transmission of communications signals as well. This release of the ring-shaped bus circuit can then follow through the application of line access methods which together with the state of technology cited in the introduction are known.

For the accomplishment of the method according to the invention, there is preferred a circuit arrangement so characterized that in the establishment of every connecting link between two subscriber locations or line terminating groups at least two computers are linked to the ring-shaped bus circuit arrangement. One of these is assigned to the calling subscriber location or line terminating group and the other is assigned to the subscriber location or line terminating group being called Information is stored in both respective computers as to those subscriber locations or line terminating groups between which connections are to be established. The advantage of the above is that an especially modest circuit complexity provides a particularly dependable communications link between various subscriber locations or line terminating groups.

The attached drawings will explain the invention through the examples which follow below:

DETAILED DESCRIPTION OF THE DRAWINGS

Figure 1:
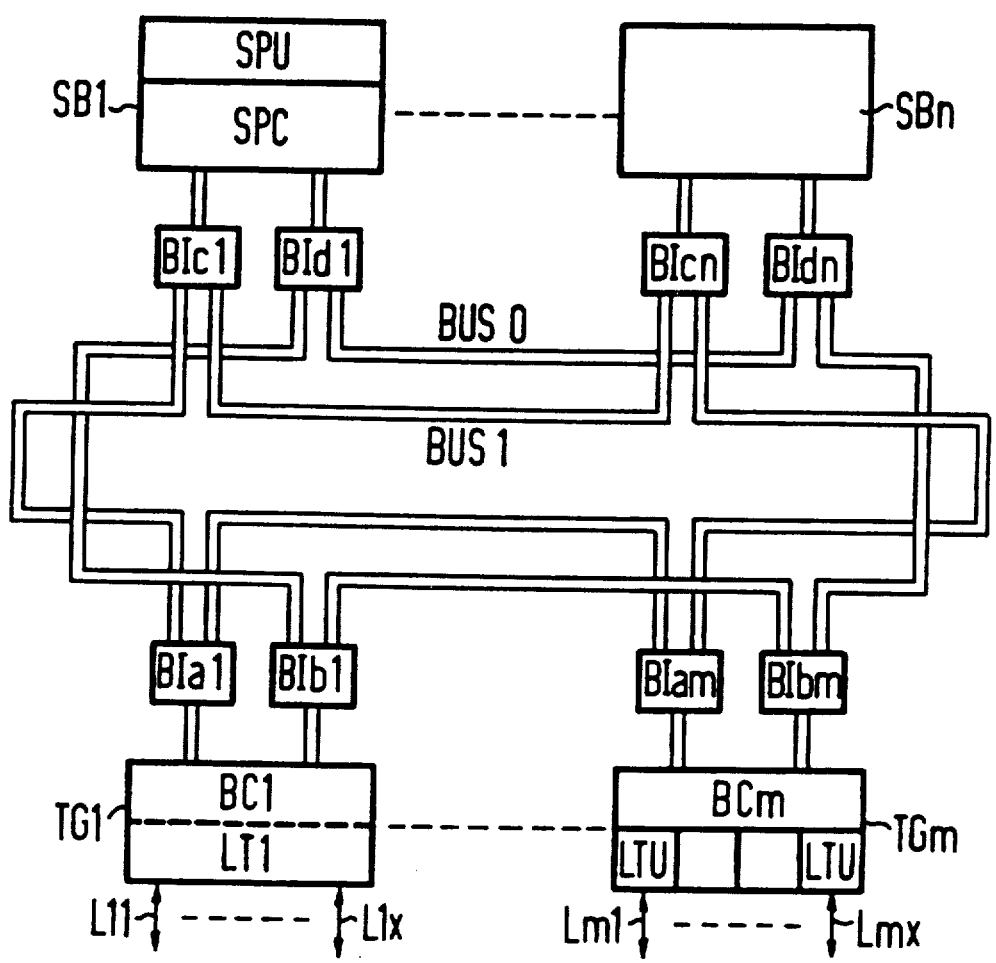
FIG. 1 illustrates by means of a block schematic diagram an overall assembly of a switching arrangement according to the invention.

In FIG. 1 is shown a block diagram of the overall assembly of a switching system according to the invention. The respective circuit arrangement shows a plurality of line terminating groups or trunk groups TGl to TGm with which a multiplicity of subscriber locations or transmission line Lll. . . Llx or Lml . . . Lmx are connected. The transmission lines shown in FIG. 1 are bi-directionally driven transmission lines over which signals are thus transmitted in both transmission directions.

The above-mentioned transmission lines are respectively connected through line or trunk transmission terminating arrangement LTU to the associated line terminating group as is indicated by their relation to the line terminating group IGm. The respective line terminating arrangement LTU of the line terminating group practically comprise a line terminating unit of which one is designated LTl in FIG. 1. With every line terminating group TGl through TGm there is associated a so-called line or trunk group control BCl through BCm which controls the transmission of the various arriving signals.

With the line terminating group TGl throug TGm shown in FIG. 1, there are associated special bus interface arrangements. The interface arrangement associated with the line terminating group TGl is designated as Blal and BIbl. The interface arrangement associated with the line terminating group TGm are shown as Blam and BIbm. The individual line terminating groups TGl through TGm lie in a ring-shaped bus circuit with these interfaces which in particular allow signal transmission in only one direction. In the case under consideration, it comprises bus ring circuits, one of which is designated BU5 0 and the other BUS 1 and which also specifically transmit signals in only one direction.

In addition to the already examined interface arrangements in the ring-shaped bus circuit, there are additional bus interface arrangements associated with signal pr cessing units SBl through SBn which serve as switchir units. In this way the computer or the switching ur SBl is joined to both of the ring-shaped bus circuits BUS 0 and BUS 1 through the interface arrangements BI and BIdl. The computer or the switching unit SBn joined to the respective ring-shaped bus circui through the interface arrangements BIcn, BIdn.

Each computer/switching unit SBl through S$ comprises a central processing unit as well as an asso( ated central processing unit control which togeth with the associated central processing unit is to 1 looked upon actually as a switching signal processor f( the related computer or switching unit. A central pr cessing unit of this type SPU associated with the cor puter or switching unit SBl is shown in FIG. 1.

Furthermore each central processing unit, e.g. SP1 controls a coupler or a central switching processing ur control associated with computer or switching unit S. and is designated as SPC.

In connection with the ring-shaped bus circuit a rangement, it has already been pointed out that these a comprised of two ring buses BUS 0 and BUS 1. Each these ring buses includes a plurality of individual co ductors, for example 16, over which signals are trar mitted in parallel data format. In this connection, it also to be noted that, of the two ring bus conducto only one is normally in operation; the other ring b remaining available as a reserve ring bus should the fi ring bus fail.

Prior to proceeding to a further explanation of t design of the switching arrangement as shown in FI( 1, the operation of the switching arrangement will discussed in greater detail. First, it must be pointed o that the switching arrangement according to the inve tion proceeds from the fact that each line terminatii group TGl through TGm is associated with one of t signal processing units SBl through SBn. To that ei are located registers in the individual line terminati: groups as well as in the individual switching units which the respective allocations are stored. In this w the register corresponding to the line terminating gro TGl may, for example, contain the address of t switching unit SBl which is specifically allocated to t line terminating unit TGl. The register of the switchi: unit SBl may store the address of the line terminatii group 1Gl by means of the transmission lines l through Llx that connect to line terminating gro1 TGl. In the registers of the switching/computers S through SBn there is stored additional information as which computer/switching unit is allocated to the 1 maining transmission lines/line terminating groups that point in time. This means that fundamentally ea computer/switching unit Sbl through Sbn serves one the line terminating groups TGl through TGm and addition has knowledge of the allocations of the stat of the remaining computer/switching units. Furth( more, each computer/switching unit SBl through S] may have allocated to it at a particular time anotl computer/switching unit as a reserve unit In the eve of a failure of the first mentioned computer/switchi unit, the reserve unit will assume its function.

Figure 2:
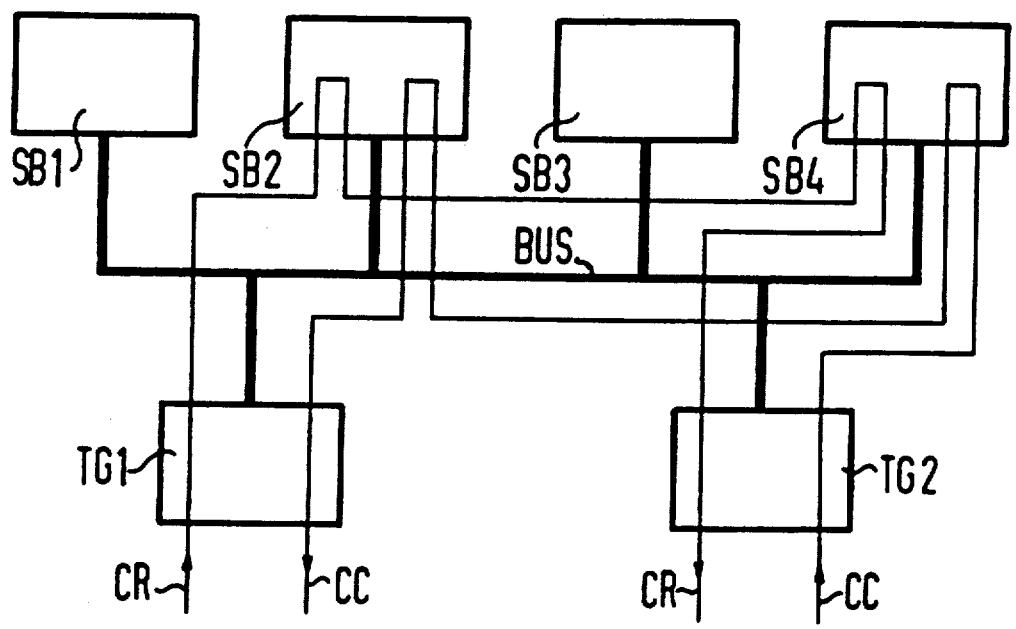
FIG. 2 illustrates by a block schematic diagram the procedures during the establishment of connections between two line terminating groups.

From the block schematic diagram of FIG. 2, one c discuss the steps taking place during the establishm( of a communications link between two trunk or st scriber line terminating groups. In accordance w FIG. 2, there are shown four computer/switching un SB1, SB2, SB3, and SB4 and two line terminati groups TG1 and TG2 which are connected in common to a single ring bus. Furthermore, it is assumed that the line terminating group TGl is assigned to the computer/switching unit SB2 and that the line terminating group 1G2 is assigned to the computer/switching unit SB4.

The appearance of a call request signal CR on one of the lines or trunks connected to the line terminating group TGl leads to the result that a connection will be established to the assigned computer SB2. Through this computer/switching unit, communication is then established in accordance with the information contained in its register with computer SB4. Through this computer SB4, there finally follows the establishment of communications with the associated line terminating group TG2. The line terminating group TG2 then relays the call request signal over the desired transmission line in accordance with call request information of the call request signal.

A call confirming signal CC, which is forwarded to the line terminating group TG2 over one of its transmission lines, in this case, the same transmission line over which the calling request signal CR was transmitted, will be further directed via the line terminating group TG2 through the computer SB4, then through the computer SB2 to the line terminating group TG1.

In connection with FIG. 2, it is to be further noted that the establishment of a link between two subscriber locations/transmission lines connected to the same line terminating group will involve only one computer/switching unit. This computer/switching unit, however, informs an associated reserve computer regarding the individual tasks to be performed in the event of failure of the primary computer/switching unit.

Figure 3:
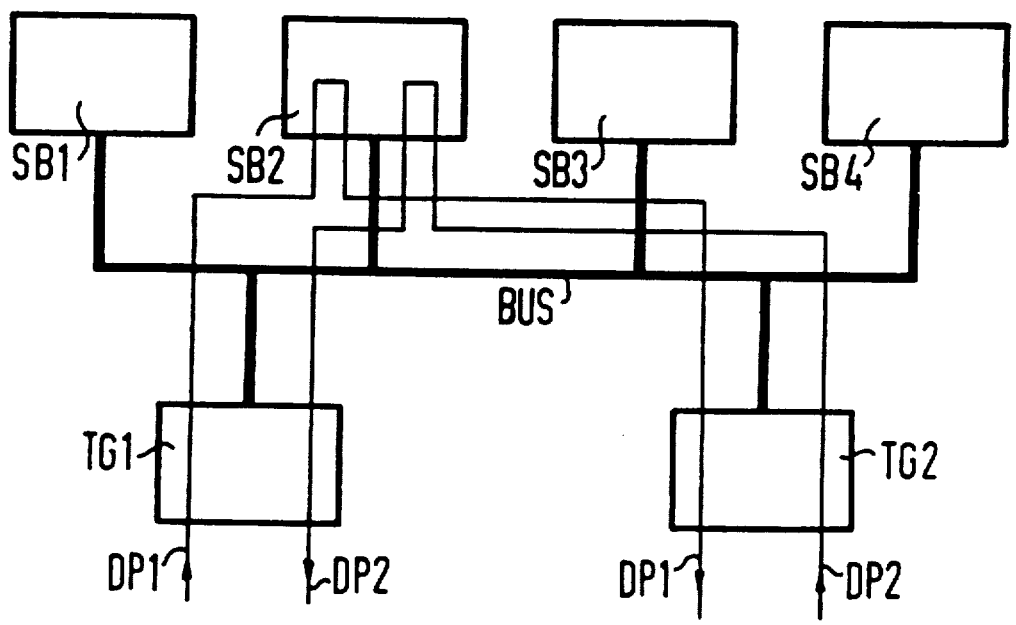
FIG. 3 illustrates by a block schematic diagram the procedures during the transmission of communications between two line terminating groups.

FIG. 3 shows the communications-transmission phase of the arrangement discussed in FIG. 2. As may be seen from FIG. 3, data and all common communications signals, e.g. text, picture, speech and other such signals, will be transmitted and/or switched, in both transmission directions, between the line terminating groups IG1 and TG2 only over that computer/switching unit SB2 associated with the calling (as opposed to called) line terminating group. The communications signals may, in particular, appear as data packets and, of course, as data packets DP1 in the direction from the line terminating group TG1 to the line terminating group TG2 and as data packets DP2 in the opposite transmission direction.

Figure 4:
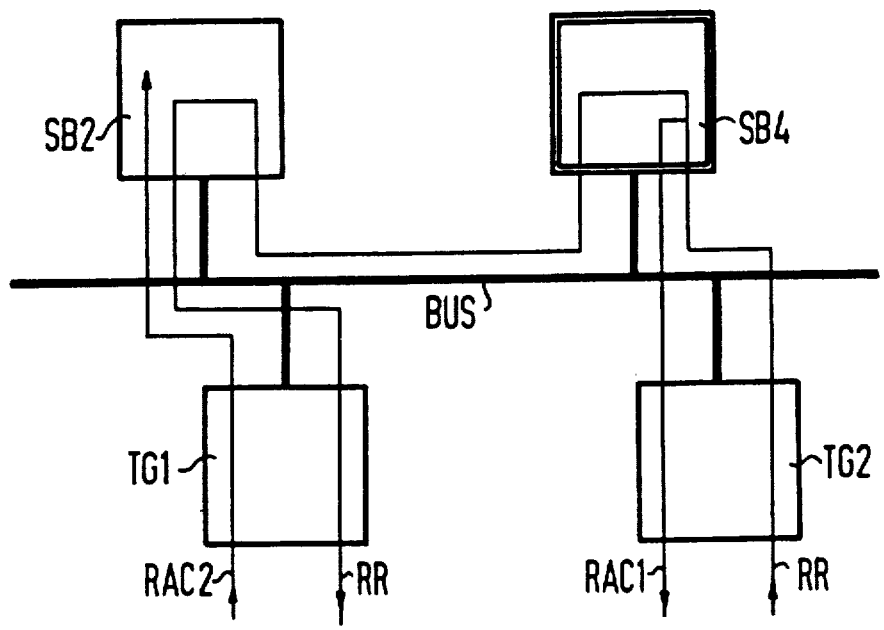
FIG. 4 illustrates by a block schematic diagram the procedures during the termination of connection between two line terminating groups.

FIG. 4 shows by block schematic diagram the steps which take place upon the clearing of the connection between two line terminating groups. In contrast to the previously considered conditions, it is assumed here that the computer/switching unit SB4 has taken on the switching function related to both the calling and called line terminating groups. The allocation process between computer/switching unit and line terminating groups is, however, the same as explained in connection with FIG. 2.

In accordance with FIG. 4, a clearing request signal RR is sent via a transmission line to the line terminating group T02. This clearing request RR reaches the associated computer/switching unit SB4 which then sends a clearing confirmation signal RAC1 to the respective line terminating group TG2. The respective line terminating group TG2 relays this clearing confirmation signal RACl over the transmission line in question. In addition, the computer/switching unit 5B4 sends the clearing signal RR, which it previously received, or a signal corresponding to this signal to the associated computer/switching unit SB2. This computer/switching unit SB2 is temporarily assigned to that line terminating group which was included in the communication but which is now to be cleared. The respective allocation, as explained above, is held in the register of the above computer/switching unit 584.

The clearing request RR, already mentioned, travels through the computer/switching unit SB2 and finally through the associated line terminating group 1Gl and from there over the transmission line in question. Over this last named transmission line, or any other transmission line, a clearing confirmation signal RAC2 is sent to line terminating group TGl which is then finally relayed to the computer/switching unit SB2.

Together with the just explained clearing phase, it has been shown that, during communications clearing, the two computer/switching units are again included, as earlier during the establishment of communications. The respective clearing request signals and clearing confirmation signals that arrive at the respective computer/switching units in the course of clearing can be employed in the respective computer/switching units to erase from their associated memory the temporarily stored entries regarding the allocations of the associated line terminating groups with the connected transmission lines.

Figure 5:
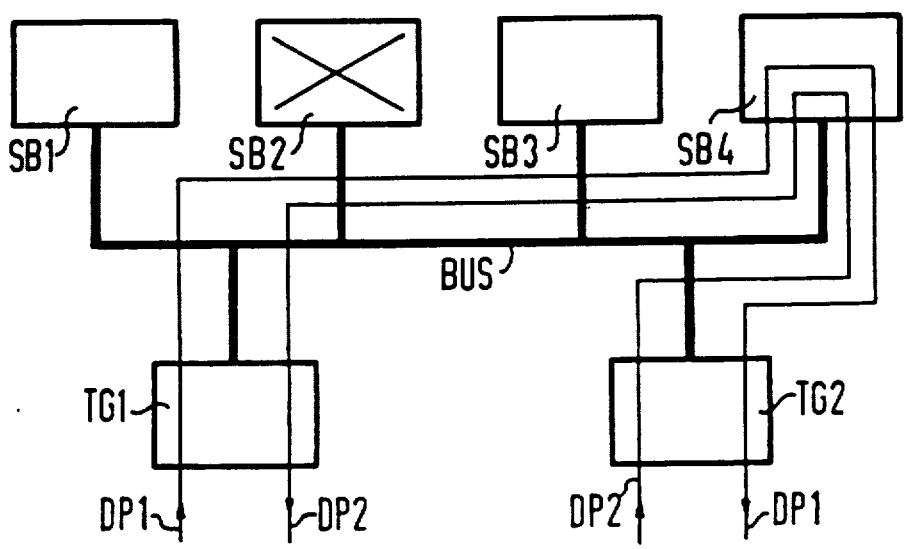
FIG. 5 illustrates by a block schematic diagram procedures during the transmission of communications between two line terminating groups in the event of a malfunction of one of the employed computers.

In FIG. 5 processes are examined which occur when a first computer/switching unit engaged in communication fails during a disturbance. FIG. 5 indicates, in this case, the same structure shown in FIG. 2 and 3. In contrast to the relationships shown in FIG. 3, however, and in accordance with FIG. 5, the computer/switching unit SB4 is now drawn into the connection between the two line terminating groups TGI and TG2 after the computer/switching unit SB2 has dropped out as the result of a disturbance. This protection during data transmission is now possible because the computer/switching unit SB4 employed for the established communication serves as a separate communications reserve unit in which information is stored regarding all connections in which the computer/switching unit SB2 may need to become involved. Accordingly in the configuration assumed in FIG. 5, the communications signals, particularly in the form of data packet signals DP1 and DP2, between the two line terminating groups are carried through the computer/switching unit SB4.

The establishment of communications, the transmission of communications signals and the clearing of communications in accordance with the invention were explained through the relationships shown in FIGS. 2 through 5. The transmission of the individual signals, and of course, also the signals during the establishment of communications and those related to the establishment of communications as well as the communications signals themselves appear on the active ring-shaped bus BU5. In order to accomplish this transmission, various transmission methods may be employed and are known from the state of technology related to ring-shaped bus circuits discussed in the Description of the Prior Art, the identified publications being incorporated herein by reference. The signal transmission may, however, also be accomplished through the employment of so-called virtual connections in which the signal block or data signal packet includes the address of the target bus interface arrangement toward which it is being directed. This address is then recognized by the targetted arrangement whereupon it, together with the address carrying signal, is gated into and accepted by the respective bus interface arrangement. The transmission of this type cf signal packet over the ring-shaped bus can then follow upon the release of the respective arrangement. For this purpose a release signal is provided in the ring-shaped bus and which will be relayed from arrangement to arrangement when a signal transmission is cleared.

Figure 6:
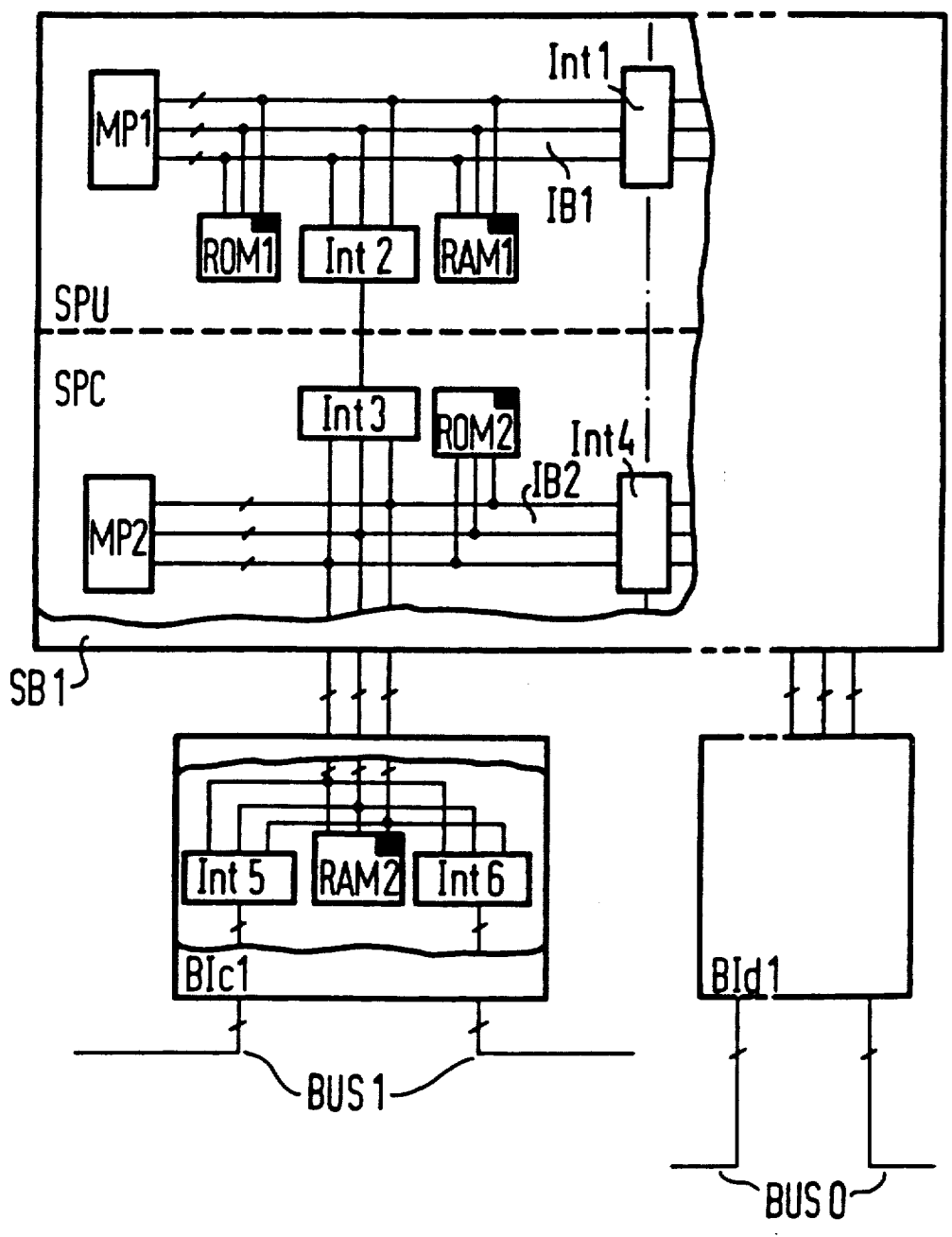
FIG. 6. shows sectionally a possible arrangement of one of the computers employed in a circuit construction according to the invention.

FIG. 6 shows separately the possible assembly of one of the computer/switching units and one of the associated bus interface arrangements. The computer SB1 shown in FIG. 6 comprises, in its central processing unit SPU block, a microprocessor MP1 which is connected to an internal bus arrangement IB1 comprising an address bus, a data bus and a control bus. Tied to this bus arrangement there are in addition a read only memory ROM1, for program storage, a random access memory RAM1 and an interface module Intl. Interface module Intl connects the respective internal bus arrangement IB1 with an additional bus arrangement which in turn is connected to one standby switching processor related to the switching processor SPU.

Connected to the internal bus arrangement IB1 there is a further interface module Int2 which is connected to an additional interface module lnt3 of the switching processor control unit SPC of computer SB1. The respective switching processor control unit SPC includes its own microprocessor MP2 which is connected to an internal bus arrangement IB2 which also comprises an address bus, a data bus and a control bus. Also, to this internal bus arrangement IB2, there is connected the previously mentioned interface module Int3 and a read only memory ROM2 to store the program needed to operate the microprocessor MP2. In addition, the internal bus arrangement IB2 is connected to a further interface module Int4 which connects the respective bus arrangement IB2 with a corresponding bus arrangement which belongs to another standby switching processor control unit of the indicated computer SB1.

The interface arrangement Blcl shown at the bottom of FIG. 6 is connected to the bus arrangement IB2. This interface arrangement encompasses two interface modules Int5 and Int6, which are connected to the aforementioned bus arrangement IB2 and which additionally connect with the ring-shaped bus arrangement BUS 1 shown in FIG. 1. In addition there is associated with the interface Blcl another read/write memory RAM2, which is also connected with the internal bus arrangement IB2. This memory RAM2 serves for the intermediate storage of data signals directed to it from either of the interface modules Int5 In16 Or from the interface module Int3.

In connection with FIG. 6, it has been previously indicated that the internal bus conductor arrangements IB1 and IB2 are interconnected with additional internal bus conductor arrangements which belong to the computer/switching arrangement SB1 corresponding to arrangements SPU/SPC. The interface arrangement BIdl which lies in the ring bus conductor BUS 0 is also associated with these additional arrangements as shown in FIG. 6.

Figure 7:
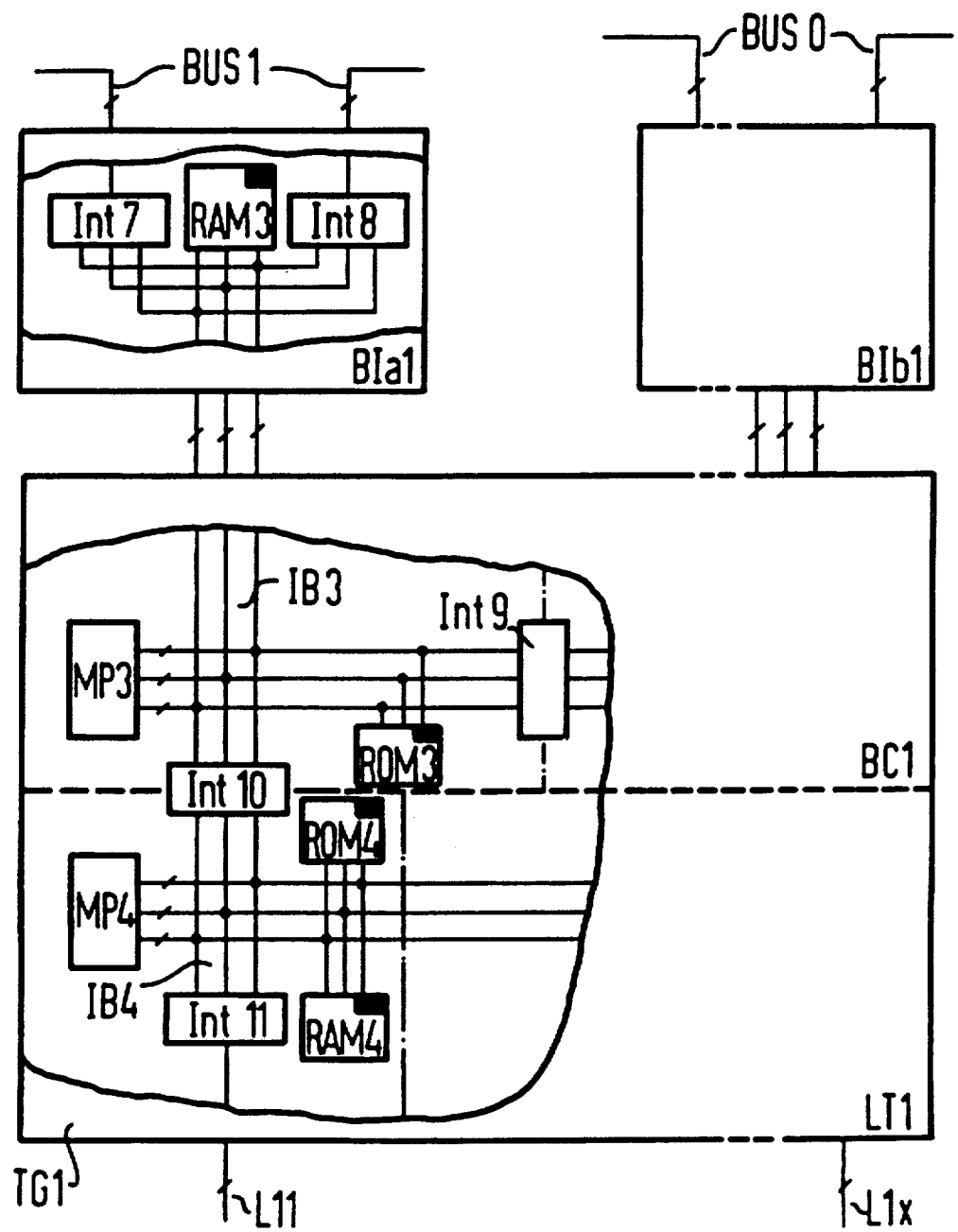
FIG. 7 shows in section a possible design of one of the line terminating groups employed in a circuit arrangement according to the invention.

In FIG. 7 is shown the possible construction of a circuit arrangement according to the invention-related line or trunk terminating groups, namely the terminating group TGl together with their associated interface arrangements Blal, BIbl. The bus interface arrangement BIal shown more clearly in FIG. 7 includes the two bus interface modules Int7, Int8 which lie on the ring-shaped bus circuit BUS 1. In addition there is associated with the interface arrangement BIal a write/read memory RAM3 which is employed as a holding memory f the data signals which it receives. The memory RAM and the two interface modules Int7, Int8 are connecte in common to internal bus circuit arrangement II which comprises an address bus, a data bus and a control bus. This internal bus circuit arrangement IB3 lea to the line terminating group IG1 and of course to tl associated line group control BC1. This line group co trol includes a microprocessor Mp3, which, togeth with a read only memory ROM3 for storing the opera ing program, is connected to the internal bus arrang ment IB3. To this internal bus arrangement IB3, there adjoined a bus interface module Int9 which connec the internal bus arrangement IB3 with a correspondir bus arrangement which is connected with the prev ously mentioned arrangements as well as with the inte face arrangement BIbI which lies on the ring bus circu BUS 0.

The internal bus configuration IB3 is connecte through an additional bus interface module Int10 to additional internal bus configuration IB4, which is ass ciated with one of the line terminating arrangemen LT1. With this respective internal bus configuration II there are also associated an additional microprocess MP4, a read only memory ROM4 containing the pr gram necessary to operate this microprocessor, a da memory RAM4 and an additional interface modu Intll. The transmission line Lll is connected to this b interface module Intll.

The remaining transmission lines belonging to the ju discussed line terminating group are connected throug the bus interface module Intll to corresponding b interface modules associated with the bus arrangeme IB4.

The internal bus arrangement IB4 is further co nected through the interface IntlO to the already me tioned internal bus arrangement IB3 which connec through the interface Int9 to a corresponding thus a rangement.

Possible constructions of FIGS. 6 and 7 as they rela to the arrangements of FIG. 1 have already been d scribed. The aforementioned microprocessors, mem ries and bus interface modules may suitably be the buil ing blocks of microprocessor systems. The internal bi configurations of FIG. 6 and 7 are actually comprise of a plurality of single conductors which, for the pu pose at hand, are shown singly with a short cross lin In conclusion, the following is to be noted in conne tion with the configuration shown in FIGS. 6 and 7. A explained, the computer/switching units and line term nating groups are in their essential parts employed, least, in pairs. At any particular time, one part of th arrangement is connected to the ring bus configuratic BUS 1 while at the same time the other part is coi nected to the ring bus configuration of BUS 0. As a ready indicated in connection with FIG. 1, only one the ring bus configurations is in operation at a tim while the other ring bus is normally held in standb reserve. If now a situation arises in which the ring bus i operation is disrupted, a transfer occurs to the still intar ring bus. For this purpose transfer signals are directe over the interface modules Int4, Int9 from the disrupte unit to the still intact unit in order to effect the transfe The related procedures will not be described in deta here however.

In connection with the computer/switching uni employed in the circuit arrangement as in accordanc with the invention, it has been indicated above that for each computer/switching unit there exists a standby reserve computer/switching unit. The respective reserve units are therefore insured of individual interconnections. This means that at all times the reserve arrangement is the computer/switching unit associated with the called subscriber location/transmission line. In addition, it has been indicated that both during the establishment of communications as well as during the transmission of communications signals, a transfer from the computer/switching unit that has been disturbed to the intact reserve computer/switching unit may be effected. It should be understood that a corresponding transfer is also possible whether communications are being established or communications signals are being transmitted. In such a case the procedure is such that, when the disturbed computer/switching unit informs the associated line terminating group of the failure condition, the allocation of the respective line terminating groups to one or more of the other computer/switching units is changed. In this way in any individual case various standby reserve-computer/switching units will be used to replace a single computer/switching unit and of course independently of whether the respective computer/switching unit and the connecting individual computer to replace the computer in question are already in communication or not.

What is claimed is:

1. A method for establishing connections and transmitting communication signals between any of a plurality of subscriber locations of a communication switching system, including a data switching system wherein said subscriber locations are connected with a plurality of line terminating groups coupled to a ring-shaped bus arrangement, said communication switching system including computers through which, at least, the traffic related to establishing connections between any of the subscriber locations is developed, said method comprising the steps of:

coupling a plurality of computers to said ring-shaped bush arrangement and using respective ones of said plurality of said computers to control the establishment of connections to and from the subscriber locations associated with respective ones of the line terminating groups included in said communication switching system;

establishing a connection between a calling subscriber location and a called one of said subscriber locations through first and second ones of said computers, said first computer serving the line terminating group associated with the calling subscriber location and said second computer serving the line terminating group associated with the called subscriber location, by establishing upon a call request signal from the calling subscriber location a first communication path between said calling subscriber location, the line terminating group associated therewith and said first computer, and establishing a second communication path, in accordance with dialing information delivered by said calling subscriber location and designating said called subscriber location, between said first computer, said second computer, the line terminating group associated with said called subscriber location and said called subscriber location;

storing, upon establishment of said first and second communication paths, information concerning said calling and said called subscriber locations and the line terminating groups associated therewith in each of said first and second computers;

transmitting a call confirming signal from said called subscriber location to said calling subscriber location upon establishment of said first and second communication paths;

after transmission of said call confirming signal, releasing one of said first and second computers from control of said first and second communication paths and using the other one of said first and second computers to control the transmission of communication signals between said calling subscriber location and said called subscriber location; and in the event of malfunction of said other one of said first and second computers, switching to and using said first-mentioned one of said first and second computers to control said first and second communication paths based upon the information concerning said calling and said called subscriber locations and the line terminating groups associated therewith stored therein.

2. A method according to claim 1, wherein said first computer is selected as the one to control transmission of communication signals between said calling subscriber location and said called subscriber location upon establishment of the connection therebetween.

3. A method according to claim 1, further comprising the step of clearing the connection established between said calling and called subscriber locations, by transmitting a clear request signal from one of said calling and called subscriber locations over said first and second computers to the other one of said calling and called subscriber locations, and erasing the information stored in said first and second computers concerning said calling and said called subscriber locations and the line terminating groups associated therewith.

4. A method according to claim 1, further comprising the step of transmitting the control and communication signals among said calling and called subscriber locations only after enabling transmission on the ring-shaped bus arrangement for the associated lien terminating groups and computers.

5. A method according to claim 1, further comprising the step of assigning each of said plurality of computers to a respective one of said line terminating groups.

6. Apparatus for establishing connections and transmitting communication signals between any of a plurality of subscriber locations of a communication switching system, including a data switching system wherein said subscriber locations are connected with a plurality of line terminating groups coupled to a ring-shaped bus arrangement, said communication switching system including computers through which, at least, the traffic related to establishing connections between any of the subscriber locations is developed, comprising:

a plurality of computers coupled to said ring-shaped bus arrangement and means for allocating respective ones of said plurality of said computers to control the establishment of connections to and from the subscriber locations associated with respective ones of the line terminating groups included in said communication switching system;

means for establishing a connection between a calling subscriber location and a called one of said subscriber locations through first and second ones of said computers, said first computer serving the line terminating group associated with the calling subscriber location and said second computer serving the line terminating group associated with the called subscriber location such that, upon a call request signal from the calling subscriber location, a first communication path is established between said calling subscriber location, the line terminating group associated therewith and said first computer, and a second communication path is established, in accordance with dialing information delivered by said calling subscriber location and designating said called subscriber location, between said first computer, said second computer, the line terminating group associated with said called subscriber location and said called subscriber location;

means for storing, upon establishment of said first and second communication paths, information concerning said calling and said called subscriber locations and the line terminating groups associated therewith in each of said first and second computers;

means for transmitting a call confirming signal fr( said called subscriber location to said calling si scriber location upon establishment of said first a second communication paths;

means operative after transmission of said call c( firming signal, for releasing one of said first a second computers from control of said first a second communication paths and using the otl one of said first and second computers to cont the transmission of communication signals betwe said calling subscriber location and said called si scriber location; and means operative in the event of malfunction of s: other one of said first and second computers, switching to and using said first-mentioned one said first and second computers to control said fi and second communication paths based upon 1 information concerning said calling and said cal] subscriber locations and the line terminati groups associated therewith stored therein.

* * * * *

UNITED STATES PATENT AND TRADEMARK OFFICE
CERTIFICATE OF CORRECTION

PATENT NO. : 5,018,059

DATED : May 21, 1991

INVENTOR(S) : Kerschner et al.

It is certified that error appears in the above—identified patent and that said Letters Patent is hereby corrected as shown below:

Column 9
   Line 41: change "bush" to read --bus--.

Column 10
   Line 41: change "lien" to read --line--.

Signed and Sealed this

Fifteenth Day of September, 1992

Attest:

DOUGLAS B. COMER

*Attesting Officer*            *Acting Commissioner of Patents and Trademarks*